April 9, 1946.  J. MIHALYI ET AL  2,398,026
COINCIDENCE TYPE RANGE FINDER
Filed Sept. 12, 1944
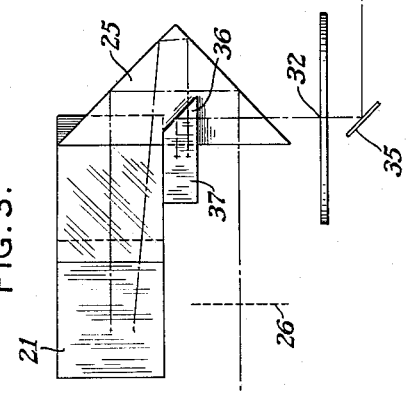
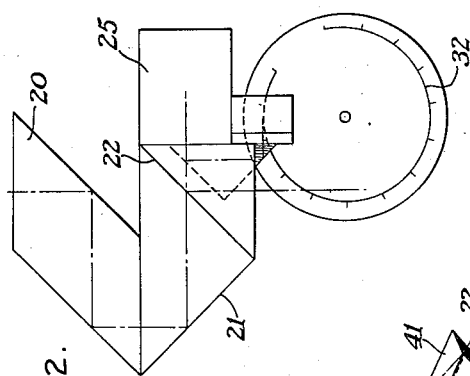
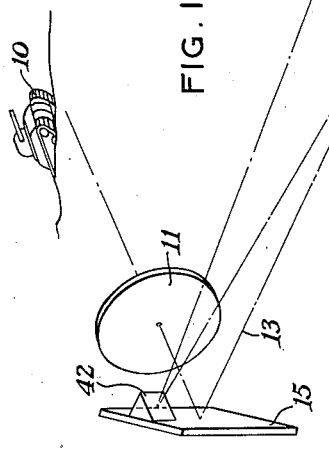
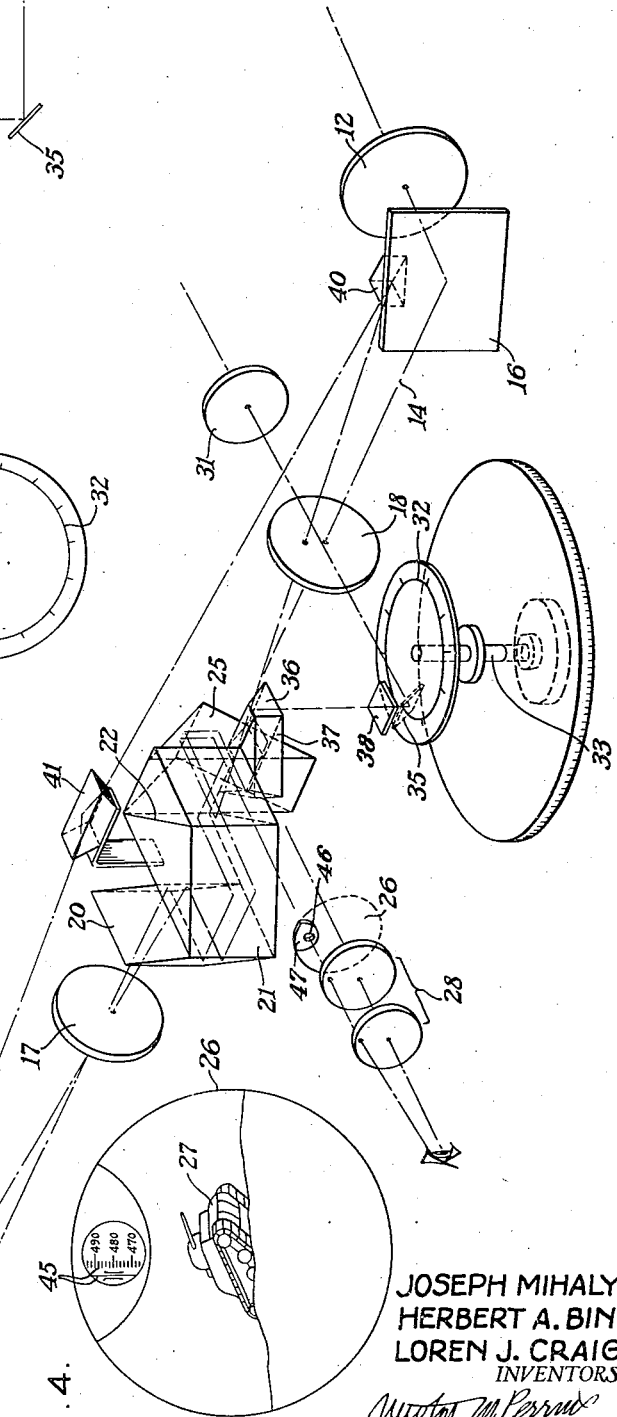
JOSEPH MIHALYI
HERBERT A. BING
LOREN J. CRAIG
INVENTORS
BY
ATT'Y & AG'T Patented Apr. 9, 1946

2,398,026

UNITED STATES PATENT OFFICE 2,398,026

COINCIDENCE TYPE RANGE FINDER

Joseph Mihalyi, Herbert A. Bing, and Loren Jackson Craig, Rochester, N. Y., assignors to Eastman Kodak Company, Rochester, N. Y., a corporation of New Jersey Application September 12, 1944, Serial No. 553,717

3 Claims. (Cl. 88—2.7)

This invention relates to range finders particularly to a central prism assembly for a coincidence type of range finder.

It is the main object of the invention to provide a simple but accurate prism assembly which will not easily get out of adjustment, for receiving two range finder beams heading directly toward each other, for combining them, for erecting them, and for presenting them to the image plane of an eyepiece.

The present invention is particularly useful in range finders of the collimating type such as described in Mihalyi's patent application Ser. No. 472,831, filed January 19, 1943, and in the long series of applications mentioned in that case. It is the object of the present invention, in this connection, to include simple but accurate means for introducing a collimation control beam into the central prism assembly so that the control image formed thereby may be viewed in the image plane of the eyepiece.

It is the third object of the present invention to provide simple means for transmitting the collimation beam as it passes to one side of the central prism assembly. That is, as the collimation control beam passes from one viewing point to the other it preferably should not interfere with the central prism assembly which is directly between the two viewing points. This particular feature is useful in any collimating range finders of the symmetrical type and thus is equally applicable, for example to the range finder described in our copending application Serial No. 553,718 filed concurrently herewith. In fact one particular advantage of the present prism assembly is that it is interchangeable with that described in the latter application so that the range finder may be easily converted from a superimposed coincidence type range finder to an invert split field type.

According to the present invention the central prism assembly is located to receive two range finder beams directed horizontally toward each other and includes a rhomboid prism in one of the beams for side shifting it relative to the other beam. A beam combining semi-reflecting surface is located in a vertical plane at about 45° to one of said beams for reflecting it horizontally to one side.

A reflector is located in the other beam for reflecting it through the beam combining surface into alignment with the first beam. It is noted that the rhomboid prism may be located in either beam. After the beams are thus combined they strike a Porro prism which reflects them both vertically either upwards or downwards and then back horizontally past the beam combining surface to the comparison plane of the range finder which is the image plane of the eyepiece. It is noted that the terms horizontal and vertical are used relative to one another, since the instrument as a whole may be tipped in any direction. In a preferred embodiment of the invention simple reflector means are included immediately below the beam combining surface for introducing a collimation control beam into the Porro prism.

In any range finder in which a collimation control beam is reflected from one viewing point to another past a prism assembly symmetrically located between the viewing points, it is convenient according to the present invention to have this beam pass through a dove prism located vertically above or vertically below the central prism assembly. That is, the collimation control beam is reflected from one viewing point upwards (or downwards) so as to by-pass the central prism assembly (and preferably any objectives in the lens system). This beam is then deviated slightly downward by the dove prism, to reach the other viewing point of the system and to be reflected thence for collimation control. The dove prism may be cemented directly to the central prism assembly or, otherwise rigidly attached thereto or, since it is not too sensitive (which is one of its peculiar advantages) it may be satisfactorily rigid when carried by the same mount as the central prism assembly.

The invention will be fully understood from the following description when read in connection with the accompanying drawing in which:

Fig. 1 is a perspective view of an optical system (somewhat foreshortened so that details appear enlarged for clarity) incorporating all of the preferred features of the present invention.

Figs. 2 and 3 are respectively a top view and a side elevation of the central prism assembly.

Fig. 4 shows the field of view of the instrument.

In Fig. 1 light from an object represented by a tank 10 is received at spaced viewing points through end windows 11 and 12 from two range finder beams 13 and 14 which are reflected by front surface mirrors 15 and 16 through objectives 17 and 18 toward a central prism assembly. This prism assembly consists first of a rhomb 20 which side shifts the beam 13 which is then reflected at a reflecting surface 21. Both beams now strike a beam combining semi-reflector 22 which transmits the beam 13 and reflects the beam 14 both horizontally into alignment. The two beams then strike a Porro prism 25 which reflects them vertically downward and then horizontally back to an image plane 26 whereat superimposed images 27 are formed. These images are viewed through an eyepiece 28.

Daylight through a window 31 is used to illuminate a collimation control element 32 in the form of a spiral mounted for rotation on a shaft 33. The purpose of this collimation control beam is fully described in Mihalyi's other applications referred to above and is not critical to the present invention or necessary for its understanding. The point is that light reflected past this control element 32 by a mirror 35 is introduced through a window 38 into the central prism assembly by three reflectors, the first being prism 36 which reflects the beam horizontally and the second and third being Porro prism 37 which reflects the beam twice more horizontally and into the main Porro prism 25 substantially horizontal but actually slightly downward so that after reflection in the Porro prism 25 the collimation control beam passes in a slightly upward direction into the rest of the prism assembly for reflection at the semi-reflector 22. This collimation control beam then passes upward through the objective 18 is reflected by reflector 40 cemented to mirror 16 and then passes above the central prism assembly to strike a dove prism 41 which reflects it down symmetrically to strike a small reflector 42 cemented to the mirror 15 whereat the collimation control beam is reflected again into substantial alignment with the range finder beam so that it is brought to focus by the objective 17 adjacent to the image 27 in the focal plane 26. The image appears in an aperture 46 in a mask 47 over a small portion of the image plane, as a line and scale 45 as shown in Fig. 4. Of course, the collimation control beam may travel its circuit in either direction, but not in both in this particular arrangement. That is, when part of the collimation control beam is reflected at surface 22 as just described, the rest of it which is transmitted either misses the spot mirror 42 entirely or strikes it at such an angle as to miss the dove prism 41 after reflection. Thus the mirrors 40 and 42 are located and oriented to handle only one beam from the collimation control element.

Since the present invention relates only to the optical system of a range finder, the usual light deviation means such as rotating or sliding wedges or tilting of one of the end mirrors has not been described. Such details may be of any well known type or as described in Mihalyi's series of applications referred to above.

Having thus described the preferred embodiment of our invention we wish to point out that it is not limited to the specific structure but is of the scope of the appended claims.

We claim:

1. A central prism assembly for a superimposed coincidence type range finder having a vertical comparison plane and in which spaced viewing point beams are directed horizontally directly toward each other comprising a rhomboid prism in one of the beams for side shifting it relative to the other, a beam combining semi-reflecting surface in a vertical plane at about 45° to one of said beams for reflecting it horizontally to one side, a second reflector for reflecting the other beam through the beam combining surface into alignment with said one beam going to one side, and a Porro prism for receiving both beams and reflecting them vertically and then back horizontally past the beam combining surface to the comparison plane of the range finder.

2. A prism assembly according to claim 1 including reflector means immediately below the beam combining surface for introducing a collimation control beam into the Porro prism at a slight vertical angle to the viewing point beams.

3. A central prism assembly for a symmetrical range finder in which collimation is assured by a control beam introduced into the central prism, sent to one of the viewing points of the range finder, reflected by auxiliary reflectors from one viewing point to the other and back to the central prism assembly, characterized by the auxiliary reflectors each being small plane single surface reflectors rigidly attached to range finder beam reflectors at the respective viewing points and by having a dove prism to one side of the assembly and facing the rest of the assembly to reflect the control beam as it passes from one viewing point to the other around the rest of the assembly, said dove prism being rigidily attached to said rest of the assembly.

JOSEPH MIHALYI.
HERBERT A. BING.
LOREN JACKSON CRAIG.